United States Patent
Royce-Winston

(10) Patent No.: US 7,424,970 B2
(45) Date of Patent: Sep. 16, 2008

(54) SYSTEM AND METHOD FOR CREATING DIGITAL CURRENCY

(76) Inventor: John Royce-Winston, 2715 Circa Dr., Matthews, NC (US) 28105

( * ) Notice: Subject to any disclaimer, the term of this patent is extended or adjusted under 35 U.S.C. 154(b) by 84 days.

(21) Appl. No.: 11/400,655

(22) Filed: Apr. 7, 2006

(65) Prior Publication Data

US 2007/0125839 A1    Jun. 7, 2007

Related U.S. Application Data

(60) Provisional application No. 60/597,525, filed on Dec. 7, 2005.

(51) Int. Cl.
*G07D 11/00* (2006.01)
*G07F 19/00* (2006.01)

(52) U.S. Cl. ........................................ 235/379

(58) Field of Classification Search ............... 235/379, 235/487, 383, 375; 705/43, 41, 45
See application file for complete search history.

(56) References Cited

U.S. PATENT DOCUMENTS

| | | |
|---|---|---|
| 5,650,604 A | 7/1997 | Marcous et al. |
| 5,963,647 A | 10/1999 | Downing et al. |
| 6,059,186 A | 5/2000 | Iijima et al. |
| 6,157,920 A | 12/2000 | Jackobsson et al. |
| 6,474,545 B1 | 11/2002 | Haeno et al. |
| 6,761,309 B2 | 7/2004 | Stoutenburg et al. |
| 2002/0122568 A1* | 9/2002 | Zhao .......................... 382/100 |
| 2002/0152166 A1* | 10/2002 | Dutta et al. .................... 705/43 |
| 2006/0089893 A1* | 4/2006 | Joseph et al. ................. 705/35 |
| 2007/0168266 A1* | 7/2007 | Questembert ................ 705/35 |

* cited by examiner

*Primary Examiner*—Edwyn Labaze
(74) *Attorney, Agent, or Firm*—Eric Karich

(57) ABSTRACT

A system and method for creating digital currency has a first automated teller machine operably connected to a central computer. A program initiated on the first automated teller machine with an initiation button functions to enable the first automated teller machine to receive physical currency with a currency scanner, to determine a sum of currency. The program then signals the central computer to create an account in a database, and to create a unique alphanumeric code associated with the account. The account includes the sum of currency. The unique alphanumeric code includes a first portion that includes the sum of currency in digital form, and a second portion that is random or user determined.

11 Claims, 2 Drawing Sheets

SYSTEM AND METHOD FOR CREATING DIGITAL CURRENCY

CROSS-REFERENCE TO RELATED APPLICATIONS

This application for a utility patent claims the benefit of U.S. Provisional Application No. 60/597,525, filed Dec. 7, 2005.

STATEMENT REGARDING FEDERALLY SPONSORED RESEARCH

Not Applicable

BACKGROUND OF THE INVENTION

1. Field of the Invention

This invention relates generally to a system and method for creating digital currency, and more particularly to a system and method for creating digital currency by receiving physical currency in an automated teller machine (ATM), determining a sum of currency, and then generating a unique alphanumeric code that includes the sum of currency.

2. Description of Related Art

Various attempts have been made to develop digital cash, including various patents, including Jakobsson, U.S. Pat. No. 6,157,920, Iijima et al., U.S. Pat. No. 6,059,186, and Haeno et al., U.S. Pat. No. 6,474,545.

There are also various methods of transferring cash in various forms, including Marcous et al., U.S. Pat. No. 5,650,604, Downing et al., U.S. Pat. No. 5,963,647, Stoutenburg et al., U.S. Pat. No. 6,761,309.

The above-described references are hereby incorporated by reference in full.

The prior art teaches various forms of digital cash. However, the prior art does not teach a system and method for creating digital currency that enables cash to be inserted into an automated teller machine (ATM), where it is transformed into a digital sum of currency that is associated with a unique alphanumeric code. The present invention fulfills these needs and provides further related advantages as described in the following summary.

SUMMARY OF THE INVENTION

The present invention teaches certain benefits in construction and use which give rise to the objectives described below.

The present invention provides a system and method for creating digital currency. The system includes a first automated teller machine operably connected to a central computer. A program initiated on the first automated teller machine with an initiation button functions to enable the first automated teller machine to receive physical currency with a currency scanner, to determine a sum of currency. The program 44 then signals the central computer to create an account in a database, and to create a unique alphanumeric code associated with the account. The account includes the sum of currency. The unique alphanumeric code includes a first portion that includes the sum of currency in digital form, and a second portion that is random or user determined.

A primary objective of the present invention is to provide a system and method for creating digital currency having advantages not taught by the prior art.

Another objective is to provide a system and method for creating digital currency that enables cash to be inserted into an automated teller machine (ATM), where it is transformed into a digital sum of currency.

A further objective is to provide a system and method for creating digital currency that enables the digital currency to be readily managed, transferred, or otherwise manipulated.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a system 10 and method for creating and manipulating digital currency using automated teller machines ("ATM").

Figure 1:
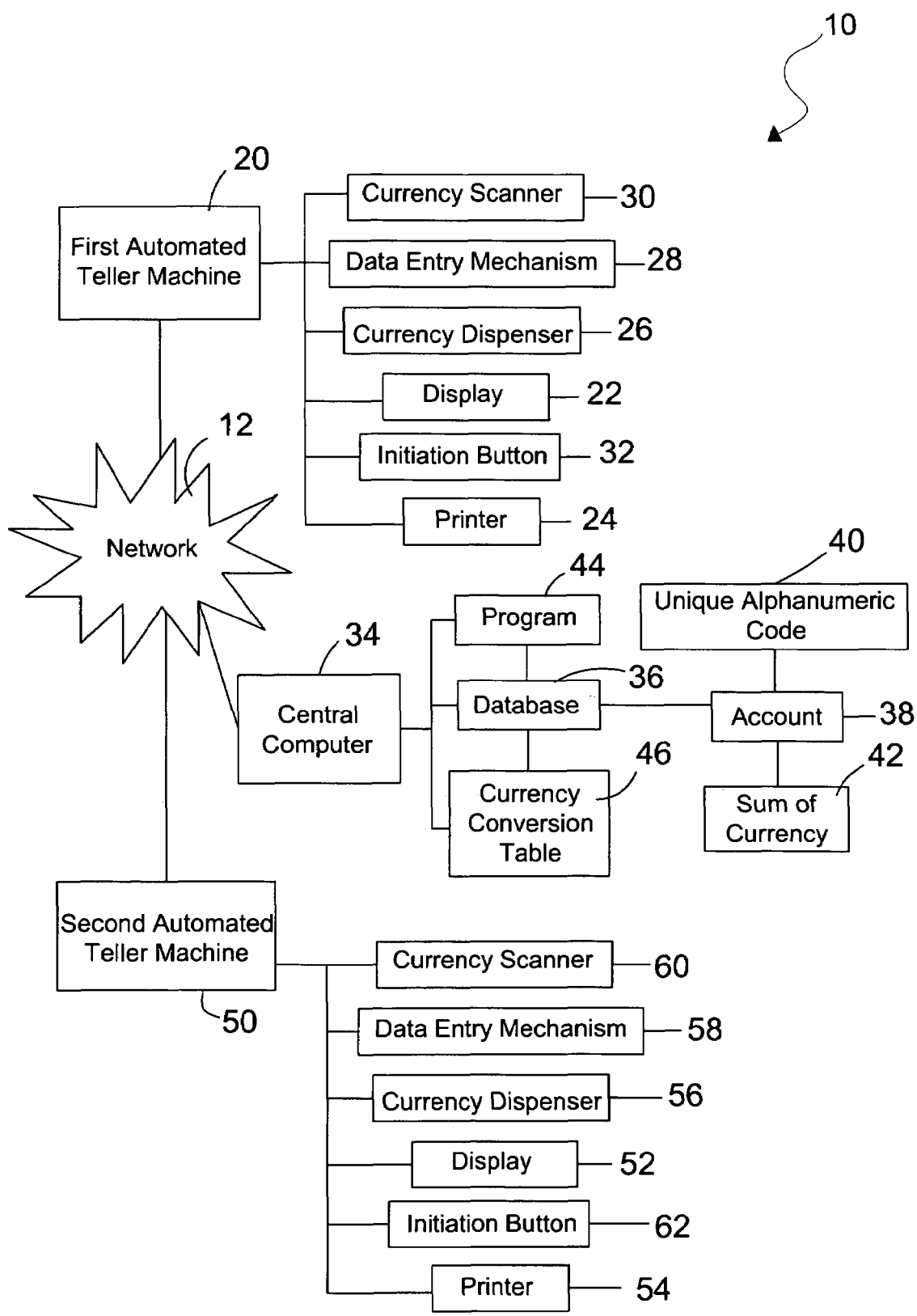
FIG. 1 is a block diagram of a system for creating digital currency.
Figure 2:
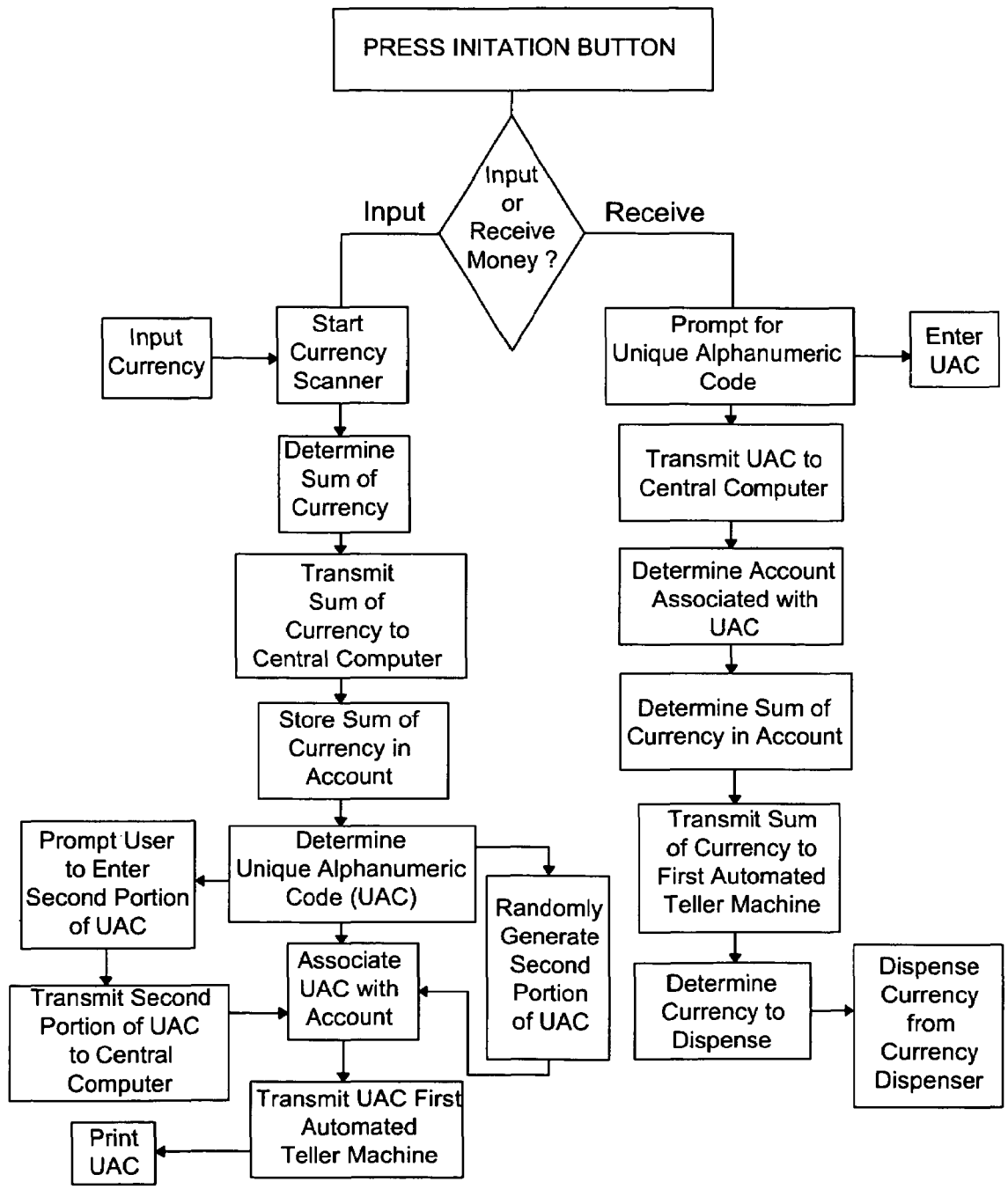
FIG. 2 is a flow diagram of a method for creating digital currency using the system shown in FIG. 1.

As shown in FIG. 1, the system 10 includes a first automated teller machine 20 and a central computer 34, and preferably further including a second automated teller machine 50. The first automated teller machine 20, the central computer 34, and the second automated teller machine 50 are all operably connected via a computer network 12, preferably the existing ATM networks such as STAR®, or some other similar or equivalent network 12.

The first automated teller machine 20 includes the features typically found on a prior art ATM, including a display 22, a printer 24, a currency dispenser 26, and a data entry mechanism 28 such as a keypad, keyboard, touch screen, or other similar or equivalent mechanism. The first automated teller machine 20 of the present invention further includes a currency scanner 30 and an initiation button 32. The currency scanner 30 functions to receive currency, scan the currency, authenticate the currency, and then to convert the currency into a digital value, a sum of currency 42, typically US dollars, although the default currency could vary depending upon the location of the first automated teller machine 20. The sum of currency 42, in digital form, is then ready to be transmitted to the central computer 34. Since such currency scanners 30 are known in the art, the technical details of such scanners are not described in greater detail herein.

For purposes of this application, the term "automated teller machine" (or "ATM") shall be defined to include a traditional ATM machine, and also any form of equivalent computer system, including but not limited to a personal computer and/or kiosk that is operably attached to a suitable computer network.

The initiation button 32 functions to activate the first automated teller machine 20 without the use of a bank card or a bank account. By pressing the initiation button 32, the user is able to activate the first automated teller machine 20 and initiate the currency scanner 30. For purposes of this application, the term initiation buttons 32 is hereby defined to include a physical button, a graphic generated on a computer monitor or touch screen, a voice prompt, or any other similar or equivalent button, trigger, or initiation mechanism known or developed by those skilled in the art. In the preferred embodiment, the initiation button 32 is provided by a computer graphic on a screen, either a touch screen, or adjacent a physical button.

The initiation button 32 should be functional to enable a user to either input currency or to receive currency. The initiation button 32 may be a single button, which then prompts the user to select between inputting or receiving currency; or, in the alternative, the initiation button 32 may be a pair of buttons, one for inputting currency and one for receiving currency. For purposes of this claimed invention, the term "initiation button 32" is hereby defined to include any of these alternative embodiment, and also any other similar or equivalent mechanisms that might be developed by those skilled in the art.

The central computer 34, operably connected to the first automated teller machine 20, includes a database 36 for creating an account 38 aid storing a unique alphanumeric code 40 associated with the account 38. The account 38 is an electronic file tat stores the sum of currency 42. The unique alphanumeric code 40 is generated as described in greater detail below, and is operably associated with the account 38. The unique alphanumeric code 40 may include any one or combination of letters and/or numbers and/or words and/or phrases and/or questions.

The central computer 34 and the first automated teller machine 20 together include a program 44 for initiating the first automated teller machine 20 in response to the initiation button 32 being pressed, for receiving a sum of currency 42 into the currency scanner 30 of the first automated teller machine 20, for creating an account 38 in the central computer 34 in response to the receipt of the sum of currency 42, and for storing the sum of currency 42 in digital form in the account 38

The program 44 also functions to generating a unique alphanumeric code 40 that is associated with the account 38. The unique alphanumeric code 40 preferably includes a first portion and a second portion. The first portion includes an alphanumeric indication of the sum of currency 42 received. For example, if $100 dollars (US) is inserted into the first automated teller machine 20, the first portion might be 500US. The second portion is preferably either a randomly generated number generated by the central computer 34, or a number provided by the user. In either case, the second portion should be long enough, and unique enough, to prevent fraud. For example, the unique alphanumeric code 40 might be 500.uh7.js8.6US. Other potential examples could be 90743.345.fer.500UA, or 500US.1956.8890.STRA. Obviously, those skilled in the art may develop a wide variety of specific methods for generating the unique alphanumeric code 40, and the unique alphanumeric code 40 might vary in length and format, and such alternatives should be considered within the scope of the present invention.

Once generated, either by the central computer 34 or by a combination of the central computer 34 and the user, the unique alphanumeric code 40 is associated with the account 38. The unique alphanumeric code 40 is also printed at the first automated teller machine 20 for reference by the user. The unique alphanumeric code 40 could be printed on a screen electronically, it could be printed on a receipt using a printer 24 such as is commonly included in automatic tellers, or it could also be delivered in alternative means, such as emailing the unique alphanumeric code 40 to a specified email address. For purposes of this application, the term "printed" is expressly defined to include all of these alternatives, as well as any other similar or equivalent method, or any other method that may be devised by those skilled in the art consistent with the teachings of this application.

Once the sum of currency 42 has been stored in the central computer 34, the user can then utilize the unique alphanumeric code 40 to manipulate the sum of currency 42 in any manner that he or she sees fit. A certificate printed by the first automated teller machine 20 could be transferred readily between the user and any other person. The unique alphanumeric code 40 could also be delivered by phone, email, or any other method to another person, regardless of the location of either the user or the other person. The user, or the other person, would then be able to retrieve the sum of currency 42 at any other computer device that is capable of accessing the communications network 12.

In the preferred system 10, the system 10 further includes a second automated teller machine 50. The second automated teller machine 50 may actually be the same device as the first automated teller machine 20, but more commonly it will be another automated teller in the network 12, and it may even be an automated teller that is located far from the first automated teller machine 20. The second automated teller machine 50 may be any automated teller machine known in the art, preferably having a data entry mechanism 58 adapted to receive the unique alphanumeric code 40.

The second automated teller machine 50 also includes the elements described above, including a display 52, a printer 54, a currency dispenser 56, and a data entry mechanism 58, and preferably also including a currency scanner 60 (although this is not required). The second automated teller machine 50 is also operably connected to the central computer 34 for transmitting the unique alphanumeric code 40 from the second automated teller machine 50 to the central computer 34. The second automated teller machine 50 may also include an initiation button 62 similar to the first automated teller machine 20, or a receive money button, or a similar mechanism for activating the second automated teller machine 50 without a bank card or account 38. The second automated teller machine 50 may also be a traditional automated teller machine, and the user of the second automated teller machine 50 may be required to have a bank card to initiate the transaction.

For purposes of this application, the term initiation button 32 may also include the use of a special bankcard or other tool that functions to initiate the ATM for the current system 10 and method.

In use, the user inputs the unique alphanumeric code 40 using the alphanumeric input device, which is hereby defined to include a keyboard, a keypad, a touchscreen, voice controls, or any other data input mechanism. The second automated teller machine 50 then transmits this information to the central computer 34, and once the central computer 34 has verified the authenticity of the unique alphanumeric code 40, the central computer 34 then sends permission to the second automated teller machine 50 to dispense the currency. A currency dispenser 26 of the second automated teller machine 50 is provided for dispensing the sum of currency 42 in the account 38 associated with the unique alphanumeric code 40.

The present invention further includes a method for utilizing the above-described system 10 for creating digital currency which can easily be managed, transferred, or otherwise manipulated. The initiation button 32 of the first automated teller machine 20 is used to activate the first automated teller machine 20 without the use of a bank card or a bank account 38. Simply pressing the initiation button 32 starts the process, so persons without a bank card or bank account 38 can easily utilize the system 10.

The user then inserts a sum of currency 42 into the currency scanner 30 of the first automated teller machine 20. Once the sum of currency 42 has been received by the first automated teller machine 20, the first automated teller machine 20 transmits the data to the central computer 34, which proceeds to create an account 38 in the central computer 34. The sum of currency 42 is then stored, in digital form, in the account 38. The sum of currency 42 is then used to form the first portion of the unique alphanumeric code 40.

As described above, the second portion of the unique alphanumeric code 40 is then generated. In one embodiment, first automated teller machine 20 prompts the user via the display 22 to input the second portion using the data entry mechanism 28. It is preferred that the second portion entered by the user meet certain standards to prevent theft, being a certain length and at least somewhat random, although easier to remember phrases may also be used or included. In another embodiment, the second portion of the unique alphanumeric code 40 is randomly generated by the central computer 34. Since the random generation of alphanumeric sequences is known in the art, this aspect of the invention is not described in greater detail herein.

The unique alphanumeric code 40 is then associated with the account 38 by the central computer 34, and the unique alphanumeric code 40 is printed, preferably on both the display 22 and on a receipt by the printer. Exactly how the unique alphanumeric code 40 is printed for the user is not important, and any form of printing, on a screen, paper, email, or other form, should also be included in the term "print."

The unique alphanumeric code 40 is then suitable for any form of manipulation, trade, exchange, or transmission that may be desired. The receipt may be physically traded, and the unique alphanumeric code 40 could also be given to a recipient over a phone, fax, or email, and the recipient could then retrieve the currency using the unique alphanumeric code 40.

When the user or recipient wants to convert the digital currency into physical currency, the unique alphanumeric code 40 is inputted into a second automated teller machine 50 (which could be the original ATM, or any other ATM). The unique alphanumeric code 40 is transmitted from the second automated teller machine 50 to the central computer 34. The unique alphanumeric code 40 is then verified by the central computer 34, and the associated account 38 is checked to determine the sum of currency 42 in the account 38. Finally, currency equaling the sum of currency 42 in the account 38 is dispensed from the cash dispenser of the second automated teller machine 50, and the account 38 is closed.

While we have described the simple situation where only a single currency is used, this described system 10 and method are also useful for exchanging currency. If the unique alphanumeric code 40 is inputted into an ATM that is located in another country that uses a different currency that the currency inputted into the first automated teller machine 20, the central computer 34 can still dispense the different currency, it just requires a currency conversion step. The central computer 34 converts the sum of currency 42 from one form of currency to another form of currency prior to transmission from the central computer 34 to the second automated teller machine 50. The central computer 34 preferably includes a currency conversion table 46 that enables this conversion.

Furthermore, it is anticipated that fees may be charged for any of the above-described services, including a transaction fee, a currency conversion fee, or any other form of convenience fee. Those skilled in the art can modify the above described systems and methods to provide for the payment of the fees. For example, the sum of currency 42 could simply be reduced by a fee amount or a percentage of value to effect payment of the fee(s).

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for creating digital currency, the method comprising the steps of:
    providing a first automated teller machine having a currency scanner and an initiation button, the initiation button functioning to activate the first automated teller machine without the use of a bank card or a bank account;
    providing a central computer operably connected to the first automated teller machine;
    initiating the first automated teller machine in response to the initiation button being pressed;
    receiving a sum of currency into the currency scanner of the first automated teller machine;
    creating an account in the central computer in response to the receipt of the sum of currency;
    storing the sum of currency in digital form in the account;
    generating a unique alphanumeric code that includes a first portion and a second portion, the first portion including an alphanumeric indication of the sum of currency;
    associating the unique alphanumeric code with the account;
    printing the unique alphanumeric code;
    transmitting the unique alphanumeric code to a recipient;
    inputting the unique alphanumeric code by the recipient into a second automated teller machine;
    transmitting the unique alphanumeric code from the second automated teller machine to the central computer; and
    dispensing from the second automated teller machine the sum of currency in the account associated with the unique alphanumeric code.

2. The method of claim 1, further comprising the step of closing the account upon the sum of currency being dispensed.

3. The method of claim 1, wherein the second portion of the unique alphanumeric code is selected by a sender and inputted into the first automated teller machine.

4. The method of claim 1, wherein the second portion of the unique alphanumeric code is randomly generated by the central computer and transmitted to the first automated teller machine.

5. A system for creating digital currency, the system comprising:
    a first automated teller machine having a currency scanner and an initiation button, the initiation button functioning to activate the first automated teller machine without the use of a bank card or a bank account;
    a central computer operably connected to the first automated teller machine, the central computer having a database for creating an account and storing a unique alphanumeric code associated with the account;
    a program for initiating the first automated teller machine in response to the initiation button being pressed, for receiving a sum of currency into the currency scanner of the first automated teller machine, for creating an account in the central computer in response to the receipt of the sum of currency, for storing the sum of currency in digital form in the account, for generating a unique alphanumeric code that includes a first portion and a second portion, the first portion including an alphanumeric indication of the sum of currency received, for associating the unique alphanumeric code with the account, and for printing the unique alphanumeric code at the first automated teller machine;
    providing a second automated teller machine having an alphanumeric input device, the alphanumeric input device being adapted to receive the unique alphanumeric code, the second automated teller machine being operably connected to the central computer for transmitting the unique alphanumeric code from the second automated teller machine to the central computer; and a currency dispenser of the second automated teller machine adapted for dispensing the sum of currency in the account associated with the unique alphanumeric code.

6. The system of claim 5, wherein the second portion of the unique alphanumeric code is selected by a sender and inputted into the first automated teller machine.

7. The system of claim 5, wherein the second portion of the unique alphanumeric code is randomly generated by the central computer and transmitted to the first automated teller machine.

8. The system of claim 5, wherein the central computer converts the sum of currency from one form of currency to another form of currency prior to transmission from the central computer to the second automated teller machine.

9. A method for creating digital currency and transferring the digital currency from a sender to a recipient, the method comprising the steps of:

providing a central computer operably connected to a first automated teller machine having a currency scanner;

receiving a sum of currency from the sender into the currency scanner of the first automated teller machine;

creating an account by the central computer in response to the receipt of the sum of currency;

storing the sum of currency in digital form in the account;

associating a unique alphanumeric code with the account;

transmitting the unique alphanumeric code to the recipient;

receiving the unique alphanumeric code from the recipient into a second automated teller machine;

transmitting the unique alphanumeric code from the second automated teller machine to the central computer; and dispensing the sum of currency in the account associated with the unique alphanumeric code to the recipient.

10. The method of claim 9, further comprising the steps of:

providing an initiation button ad the first automated teller, the initiation button functioning to activate the automated teller machine; and initiating the first automated teller machine in response to the initiator button to receive the sum of currency.

11. The method of claim 9, further comprising the step of printing the unique alphanumeric code once it has been associated with the account.

* * * * *